(12) United States Patent
Nishii

(10) Patent No.: US 6,501,556 B1
(45) Date of Patent: Dec. 31, 2002

(54) IMAGE FORMING APPARATUS HAVING A TRIAL PRINT MODE

(75) Inventor: Wataru Nishii, Yamatokooriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/219,237

(22) Filed: Dec. 22, 1998

(30) Foreign Application Priority Data

Dec. 25, 1997 (JP) ............................................. 9-356481

(51) Int. Cl.[7] ............................................... G06F 15/00
(52) U.S. Cl. ..................... 358/1.12; 358/1.16; 358/1.18; 358/450; 358/1.15
(58) Field of Search ............................... 358/1.12, 1.15, 358/1.16, 1.18, 401, 468, 448, 451, 453, 450

(56) References Cited

U.S. PATENT DOCUMENTS

| | | | | |
|---|---|---|---|---|
| 5,222,157 A | * | 6/1993 | Yoneda | 382/41 |
| 5,774,235 A | * | 6/1998 | Arakawa | 358/453 |
| 5,943,679 A | * | 8/1999 | Niles | 707/526 |
| 5,959,744 A | * | 9/1999 | Kohri | 358/450 |
| 6,424,752 B1 | * | 7/2002 | Katayama | 382/284 |

FOREIGN PATENT DOCUMENTS

| | | | | |
|---|---|---|---|---|
| EP | 0534320 A2 | * | 3/1993 | H04N/1/387 |
| JP | A-60-221770 | | 11/1985 | G03G/15/00 |
| JP | A-61-265964 | | 11/1986 | H04N/1/387 |
| JP | A-04-123665 | | 4/1992 | G03G/15/00 |
| JP | A-8-137150 | | 5/1996 | H04N/1/38 |

* cited by examiner

Primary Examiner—Jerome Grant, II
(74) Attorney, Agent, or Firm—Dike, Bronstein, Roberts & Cushman; David G. Conlin

(57) ABSTRACT

An image forming apparatus has a normal print mode in which input image data for a plurality of pages are processed into images on the same number of pages of paper, and a trial print mode in which the input image data are processed into minified images on fewer pages of the paper for trial output such that a user can check an output result to be obtained in the normal mode beforehand. In the trial print mode, a blank page detector detects a blank page from the input image data, and an image data minifier converts the image data stored in an image data buffer into minified image data and stores the data in a second buffer. Then, a plotting section develops the minified image data read from the second data buffer into a plotting pattern, which is then written to a page buffer. In an output section, the plotting pattern read from the page buffer is processed into a visible image. At this time, an image corresponding to the blank page detected by the blank page detector is not formed.

7 Claims, 10 Drawing Sheets

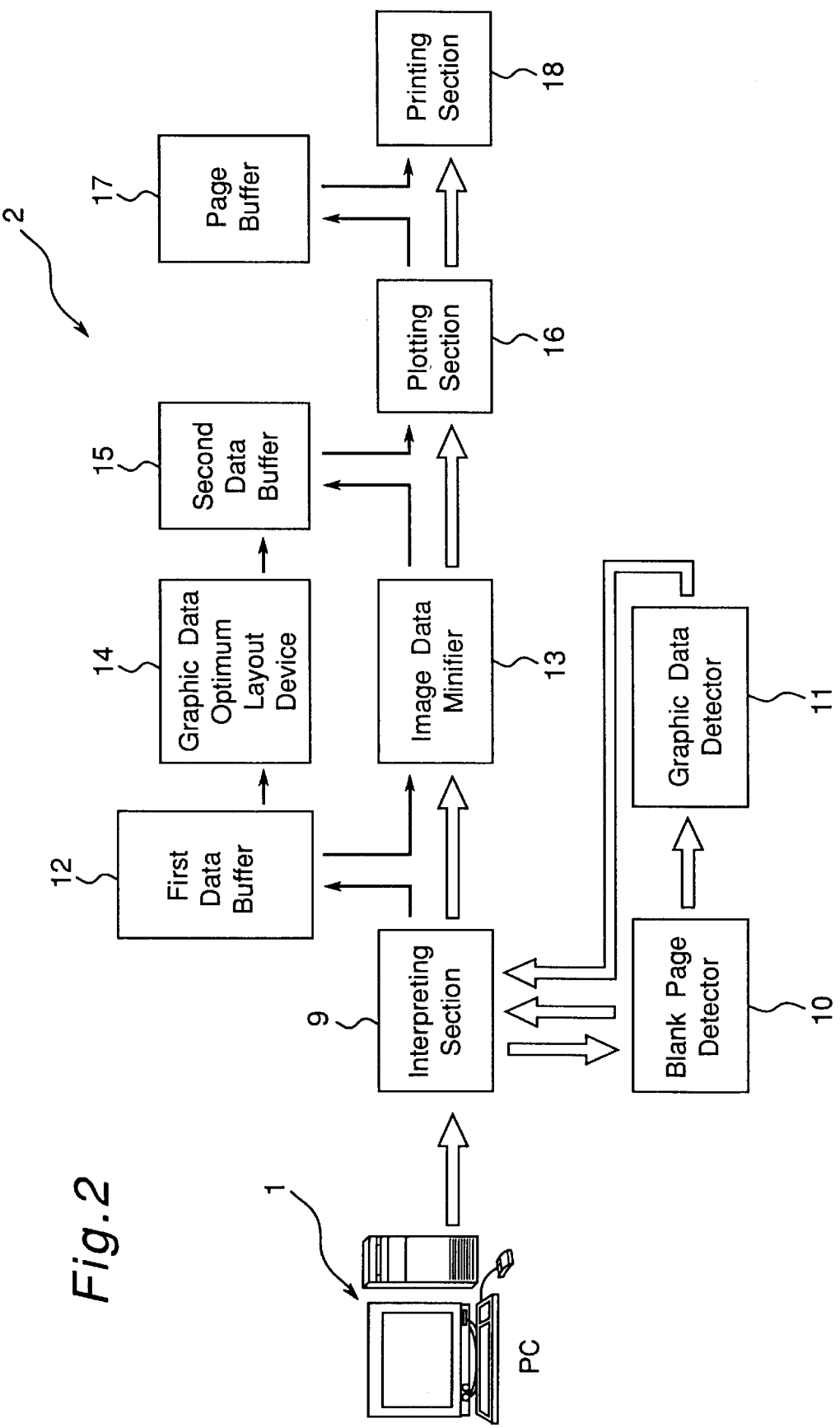

IMAGE FORMING APPARATUS HAVING A TRIAL PRINT MODE

BACKGROUND OF THE INVENTION

The present invention relates to an image forming apparatus adapted to output an image corresponding to input image data in a visible form onto a recording medium. In particular, the present invention relates to an image forming apparatus, such as a printer, a digital copying apparatus, or the like, that is used as an output apparatus in an information processing system.

Conventional image forming apparatuses allow a user (operator) to set various conditions such as a density, a magnification, and the like at his or her choice, and print out an image reproduced according to set conditions on a recording medium such as paper.

However, in hard copies obtained, it occurs in some cases that an actual printed result is different from the expectation of the operator. In this case, it is necessary to print again by altering various set conditions so that the reproduced image can be printed with an image quality as desired by the operator. In particular, when a plurality of hard copies are made, the recording media and the developer such as toner are wasted.

In view of the problem, Japanese Patent Laid-Open Publication No. 60-221770 proposes a copying operation control method for a copying machine in which a copying operation is continuously performed on each of a plurality of documents placed on a document mount such that copied images for each of the documents are formed. According to the proposed copying operation control method, two or more documents placed on the document mount are scanned separately for the image of each document to be copied on a separate sheet of copying paper. Then, in order to prevent a large amount of miscopies from being produced, in making two or more copies for each of two or more originals, initially, a single-copy making operation is performed, i.e., only a single copy of each document is produced and then, the rest of the required copies is produced continuously.

The copying operation control method disclosed in the Japanese Patent Laid-Open Publication No. 60-221770 is effective in that it is possible to check whether the originals, or documents have been placed on the mount favorably by examining the copying result of the single-copy making operation performed initially, and thus, to prevent the image thereof from being erroneously copied in the continuous copying operations performed thereafter.

However, in an image forming apparatus disclosed in the publication, there is still a problem that when the number of pages of originals, or documents, to be copied at the same time is large, the recording medium such as paper, and the developer such as toner are wasted a lot.

SUMMARY OF THE INVENTION

The present invention has been made in view of the above problem, and it is an object of the present invention to provide an improvement on image forming apparatuses adapted to output an image corresponding input image data in a visible form, especially on an image forming apparatus, such as a page printer, which is used as an output apparatus in an information processing system, the improvement being able to prevent the recording media and the developer being wasted.

In order to accomplish the above object, the present invention provides an image forming apparatus comprising:

a first storage for storing image data;

an image data minifying device for converting the image data stored in the first storage into minified image data;

a second storage for storing the minified image data;

a plotting section for developing the image data stored in the first storage or the minified image data stored in the second storage into a plotting pattern;

a third storage for storing the plotting pattern;

an output section for processing the plotting pattern stored in the third storage into a visible image on a recording medium and outputting the recording medium;

a mode setting device for setting an operational mode of the image forming apparatus, the mode setting device switching the operational mode between a normal mode and a trial output mode, wherein in the normal mode, input image data for a plurality of pages are processed into images on the plurality of pages of the recording medium, while in the trial output mode, the input image data is processed into minified images on fewer pages of the recording medium for trial output such that a user can check an output result to be obtained in the normal mode beforehand; and a blank page detector for detecting a blank page with no image data from the input image data, wherein in the trial output mode, an image corresponding to the blank page detected by the blank page detector is not formed on the recording medium.

According to the image forming apparatus of the invention, it is possible to print a plurality of pages of images on one page of the recording medium by minifying them. In addition, because the blank page is omitted from image formation on the recording medium in the trial output mode, it is possible to reduce the amount (or the number of pages) of the recording medium to be used. Thus, consumables such as recording media (paper, for example) and developer are prevented from being wasted. Especially in the case of output in color, because a plurality of developers (for example, black, yellow, magenta, cyan) can be saved, the image forming apparatus of the invention is very useful.

In one embodiment, the image forming apparatus further includes a controller for adding data indicative of page numbers of the input image data to the minified image data at positions corresponding to respective page number areas such that the minified images derived from the minified image data are associated with the respective images derived from the input image data.

In this embodiment, a user can check the position of the blank page without outputting the blank page by checking the page numbers.

In one embodiment, the image forming apparatus includes a controller for, in the trial output mode, outputting image portions corresponding to character data included in the minified image data in the form of dots or frames.

This arrangement is useful if trial output is performed only to check layout. Because image data is output as dots or frames instead of characters or the like, it is possible to save developer. In addition, processing speed for image formation can be increased.

In one embodiment, the image forming apparatus includes:

a graphic data detector for detecting graphic data included in the input image data; and a controller for, in the trial output mode, replacing the detected graphic data with data of a frame such that an image corresponding to the graphic data is represented by the frame.

Printing graphic data generally takes much time and consumes a large amount of developer. According to the image forming apparatus in this embodiment, however, only a frame is printed at the position of the graphic data. Thus, it is possible to not only check the position of the graphic data but also save time and developer.

In one embodiment, the image forming apparatus further includes:

a graphic data storage for storing only the graphic data detected by the graphic data detector; and a controller for, in the trial output mode, reading the graphic data from the graphic data storage after formation of minified images based on the minified image data including no graphic data, so as to form a graphic image based on the graphic data, without minifying the graphic data, on a page of the recording medium different from the page or pages bearing the minified images.

It is possible that as a result of size reduction of the image in the trial output mode, the resulting graphic image becomes smaller than expected by an operator, and therefore that the trial output is again performed in a different size reduction ratio to check the graphic image. In this case, the recording medium such as paper, the developer, and time are wasted. In contrast, according to the image forming apparatus of the embodiment, because the graphic image is formed without being reduced in size, independently of the other minified images, the above problem is solved.

In one embodiment, the image forming apparatus includes graphic data optimum layout device for, in the trial output mode, performing an optimum layout of a plurality of the graphic data read from the graphic data storage such that graphic images based on the plurality of the graphic data, not minified, are formed on as few pages as possible, independently of the minified images.

If in the trial output mode, a plurality of graphic images are formed on respective pages of the recording medium in the same size of an original graphic image, a large amount of the recording medium is needed. Forming a plurality of graphic images on one page can reduce the consumption of the recording medium. However, if the graphic images are arranged in the order of occurrence of the graphic data, there may be a lot of dead space on the recording medium, depending on a combination of the graphic data. Thus, the recording medium cannot be utilized effectively. In contrast, according to the image forming apparatus of this embodiment, the graphic data to be output on one page of the recording medium are optimally combined. Therefore, as many graphic images as possible are formed on one page such that dead space of the recording medium is minimized. Thus, it is possible to reduce the consumption of the recording medium.

In one embodiment, the image forming apparatus includes a controller for adding mutually corresponding pieces of information (such as image numbers) to the graphic image and the frame in the minified image respectively when the graphic image is formed on the different page of the recording medium based on the graphic data not minified, to indicate correspondence between the graphic image and the frame indicative of the graphic image portion in the minified image.

When the combination of the graphic data is optimized, it may occur that the output order of the graphic data changes. But, thanks to the mutually corresponding pieces of information added to the graphic image and the frame in the minified image, the operator can know where the graphic images are originally located, even though the output order of the graphic data changes.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a circuit block diagram of the image forming apparatus shown in FIG. 1B;

DETAILED DESCRIPTION OF THE PREFERRED EMBODIMENTS

An embodiment of the present invention will be described below with reference to FIGS. 1–10.

The following describes only a case in which the present invention is applied to an image forming apparatus connected with an information processing apparatus such as a personal computer (hereinafter referred to as "PC"). But the present invention is broadly applicable to various kinds of image forming apparatuses, as far as they are adapted to output an image corresponding to input image data in a visible form. Especially, the present invention is applicable to image forming apparatuses to be used as an output apparatus in an information processing system, such as a page printer, a laser printer, an ink jet printer, a thermal printer, a heat transfer printer, a digital copying machine, an analog copying machine, etc. Needless to say, the present invention is applicable to both image forming apparatuses for color output and image forming apparatuses for monochrome output.

The following describes a case in which the recording medium is paper and the developer is toner. But the present invention is not limited to the case. For example, ink may be used as the developer and OHP sheets or sheets of any other type may be used as the recording medium instead of paper.

Figure 1A:
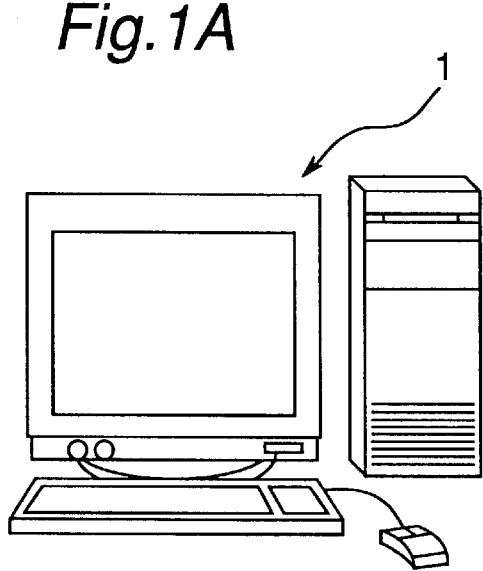
FIG. 1A shows a personal computer for processing information.
Figure 1B:
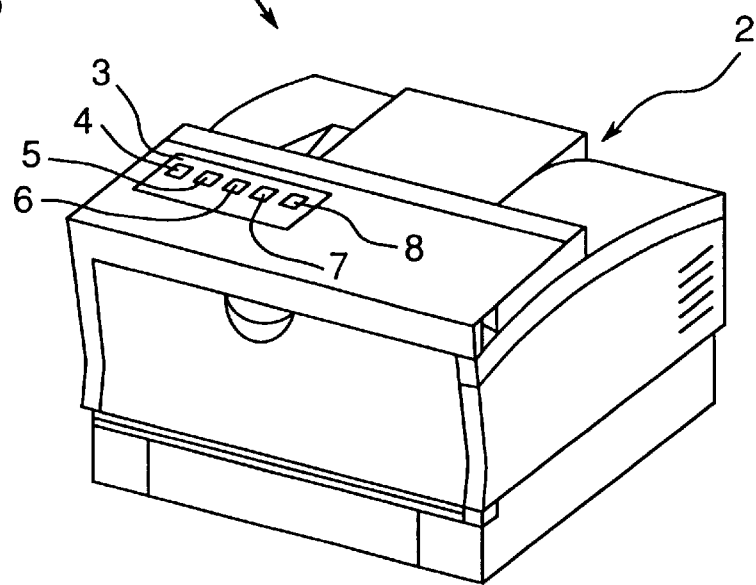
FIG. 1B is a perspective view of an embodiment of the image forming apparatus according to the present invention, which is connected with the personal computer of FIG. 1A.

FIG. 1A shows a PC 1 as an information processing apparatus and FIG. 1B shows a printer 2 as an image forming apparatus according to an embodiment of the invention. The printer 2 is connected with the PC 1 through a suitable communication means so that they can transmit information to each other. The image processing apparatus 1 and the printer 2 may be connected with each other by a cable, or through optical communication using light such as infrared rays, or radio communication. Further, one-to-one connection or a network connection such as LAN may be used.

The printer 2 has a control panel 3 through which an operator, or user, sets various modes. The printer 2 also has a trial print mode key 4 for setting a trial print mode, a blank page output mode key 5 for setting a blank page output mode in which a blank page is detected, a graphic output mode key 6 for setting a graphic output mode in which detected graphic data is processed for output, an image data minify mode key 7 for setting an image data minify mode in which image data is minified, and a toner save mode key 8 for setting a toner save mode in which the amount of toner is adjusted.

FIG. 2 is a block diagram of circuitry of the printer 2 for enabling trial printing to be accomplished.

Referring to FIG. 2, in accordance with a predetermined command sequence, an interpreting section 9 interprets input data to be printed sent thereto from a host apparatus such as a host computer or a personal computer (in the embodiment, the host apparatus is the PC 1). The input data are sent to a blank page detector 10.

If an instruction of performing trial printing has been set by a command from the PC 1 or by the trial print mode key 4 of the control panel 3, and if a blank page is detected by the blank page detector 10, the interpreting section 9 processes the blank page in accordance with a relevant command from the PC 1 or the setting of the blank page output mode key 5.

Figure 3:
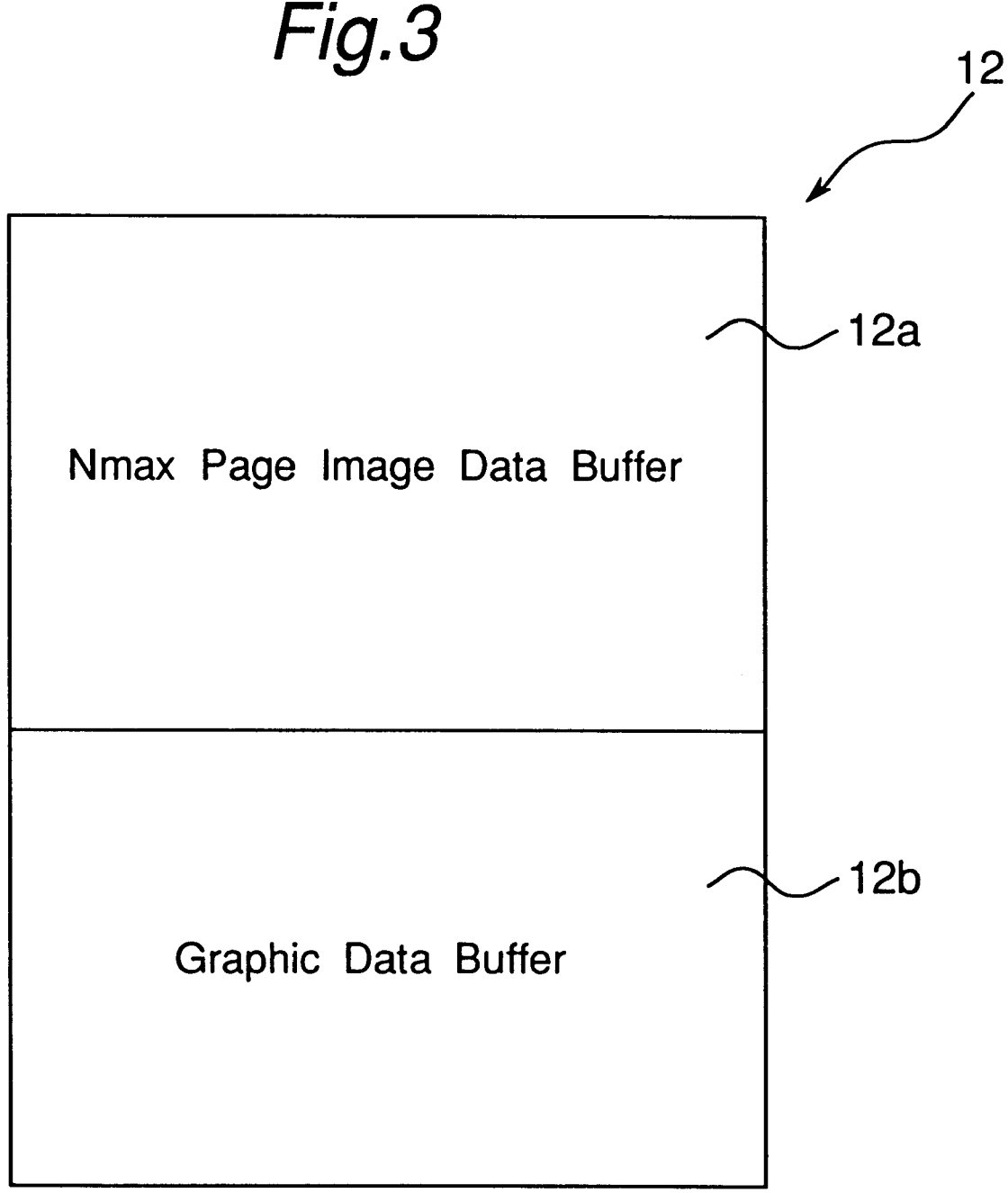
FIG. 3 shows contents of a first data buffer in the embodiment.

The input data to be printed are also sent to a graphic data detector 11 via the blank page detector 10. If graphic data is detected by the graphic data detector 11, the interpreting section 9 processes the graphic data in accordance with a relevant command from the PC 1 or the setting of the graphic output mode key 6. Thereafter, the input image data to be printed is written to a first data buffer 12. FIG. 3 indicates contents of the first data buffer 12 which is composed of an Nmax page image data buffer 12$a$ (hereinafter, referred to as "first data buffer 12$a$") for storing image data for a maximum number of pages Nmax, and a graphic data buffer 12$b$ (hereinafter, referred to as "first data buffer 12$b$") for storing only graphic data.

The data, which has been processed by the interpreting section 9 in accordance with the relevant command or the setting of the graphic output mode key 6, is written to the first data buffers 12$a$ and 12$b$. The operation is repeated until the first data buffers 12$a$ and 12$b$ are full.

An image data minifier 13 processes image data stored in the first data buffer 12$a$ in accordance with a relevant command from the PC 1 or a setting of the image data minify mode key 7, and writes the processed data to a second data buffer 15. This operation is repeated until the second data buffer 15 gets full of the processed data.

Once the second data buffer 15 gets full, a plotting section 16 expands the data of the second data buffer 15 into a plotting pattern on a page buffer 17. Once the page buffer 17 gets full, a printing section 18 starts printing.

When the printer has been set so as to print out the graphic data independently on a separate sheet of paper by the command from the PC 1 or the graphic data output mode key 6, the graphic data stored in the first data buffer 12$b$ is written to the second data buffer 15 after the first data buffer 12$a$ becomes empty. The operation is repeated until the second data buffer 15 becomes full of the graphic data.

When the second data buffer 15 gets full of the graphic data, the plotting section 16 expands the graphic data of the second data buffer 15 into a plotting pattern on the page buffer 17. After the page buffer 17 gets full, the printing section 18 starts printing.

The printing section 18 adjusts the amount of toner in accordance with a relevant command or setting of the toner saving mode key 8.

Figure 4:
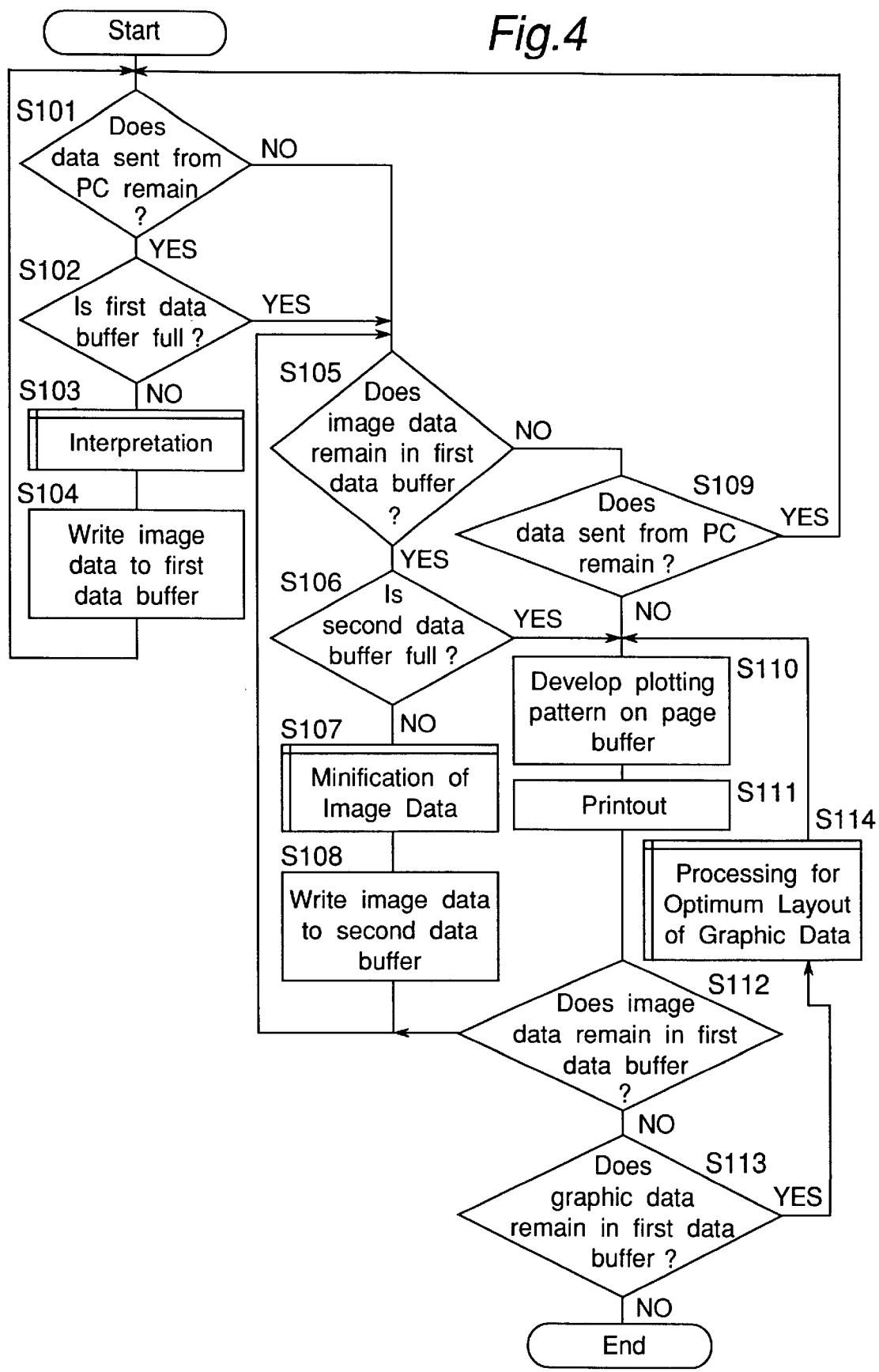
FIG. 4 is a flowchart of a process for controlling a trial printing function of the embodiment.

Taking into account the description made above, the flowchart shown in FIG. 4 for controlling the trial printing function of the present invention will be described below.

Initially, at step S101, it is determined whether there is still data to be printed (referred to also as "print data"), sent from the PC1. If there is still such data, then it is determined at S102 whether the first data buffer 12$a$ is write-enabled or not, that is, whether the first data buffer 12$a$ is full or not.

If the first data buffer 12$a$ is write-enabled, or not full, the interpreting section 9 interprets the command, according to a predetermined command sequence at step S103. Based on a result obtained by the processing of the interpreting section 9, print data is written to the first data buffers 12$a$ and 12$b$ at S104.

If it is determined at S102 that the first data buffer 12$a$ is full, the processing proceeds to S105 and then S106. It is determined at S106 whether all data to be printed on one sheet of paper has been written to the second data buffer 15. If not, the image data minifier 13 minifies the data in accordance with a relevant command or a setting of the image data minify mode key 7 at S107. Then, at S108, the minified data are written to the second data buffer 15.

If it is determined at step S106 that the second data buffer 15 is full, the plotting section 16 develops a plotting pattern on the page buffer 17 at S110, and the printing section 18 executes printing at Sill.

If it is determined at S112 that the image data remains in the first data buffer 12$a$ after printing is carried out at Sill, the program returns to S105.

If it is determined at step S102 that the first data buffer 12$a$ is full, this indicates that there is still print data from the PC 1 to be processed. Thus, the processing of S105 through S109 is repeated. If it is determined at S105 that the data does not remain in the first data buffer 12$a$, the program returns to S101 via S109.

If the printer has been set so as to print the graphic data independently on a separate sheet of paper by a relevant command or pressing of the graphic output mode key 6, processing proceeds to S114 via S113 after it is determined at step S112 that there is no data in the first data buffer 12$a$. At S114, a graphic data optimum layout device 14 processes the graphic data.

Then, at S110, the plotting section 16 develops a plotting pattern on the page buffer 17. Then, at S111, the printing section 18 executes printing.

Figure 5:
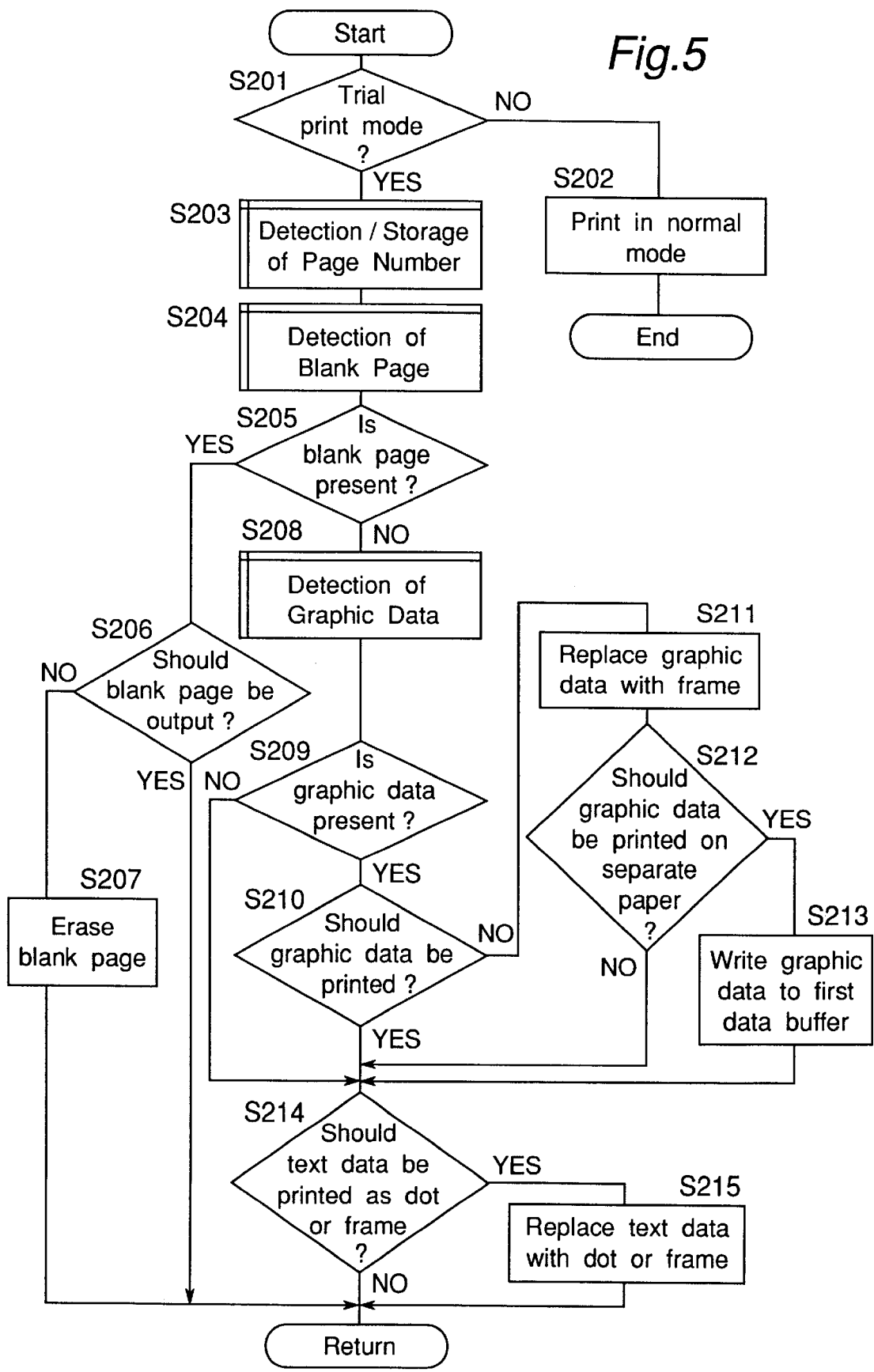
FIG. 5 is a flowchart of a process to be performed in an interpreting section in the embodiment.

FIG. 5 shows the flowchart showing the operation of the interpreting section 9. The outline of the operation of the interpreting section 9 will be described below with reference to FIG. 5.

Initially, the interpreting section 9 interprets an entered command, according to a predetermined command sequence. That is, it is determined at S201 whether the trial print mode has been set. If the trial print mode has been set, the program goes to step S203 at which commands indicating a beginning (or top) and an end of a page are detected from the print data sent from the PC 1, and a page number for each page sent from the PC 1 is stored. The reason the page numbers are stored is to prevent page numbers from being shifted when blank pages are not printed at step S206, the operation of which will be described later.

At S204, the blank page detector 10 operates to detect blank pages. It is determined at S205 whether any blank pages are present. If a blank page is present, then it is determined at S206 whether the blank page should be output. If the blank page does not need to be output, the blank page is erased at S207.

If it is determined at S205 that no blank pages are present, detection of graphic data is performed by the graphic data detector 11 at S208, and it is discriminated at S209 whether graphic data is included in the print data sent from the PC 1.

If it is determined at step S209 that the print data includes graphic data, then it is determined at S210 whether the graphic data is to be printed. If it is determined that the graphic data does not need to be printed, the graphic data is replaced with a frame at S211. It is determined at S212 whether a mode of printing the graphic data independently on a separate sheet of copying paper without minifying it has been set. If it is determined that the graphic data is to be printed on a separate sheet of copying paper, that is, the graphic data and the other image data including character data are to be printed separately from each other on different sheets of paper, the graphic data is written to the first data buffer 12b at S213. If it is determined at S209 that no graphic data is present, it is determined at S214 whether text data, or character data, are to be printed in the form of dots or frames.

Figure 6:
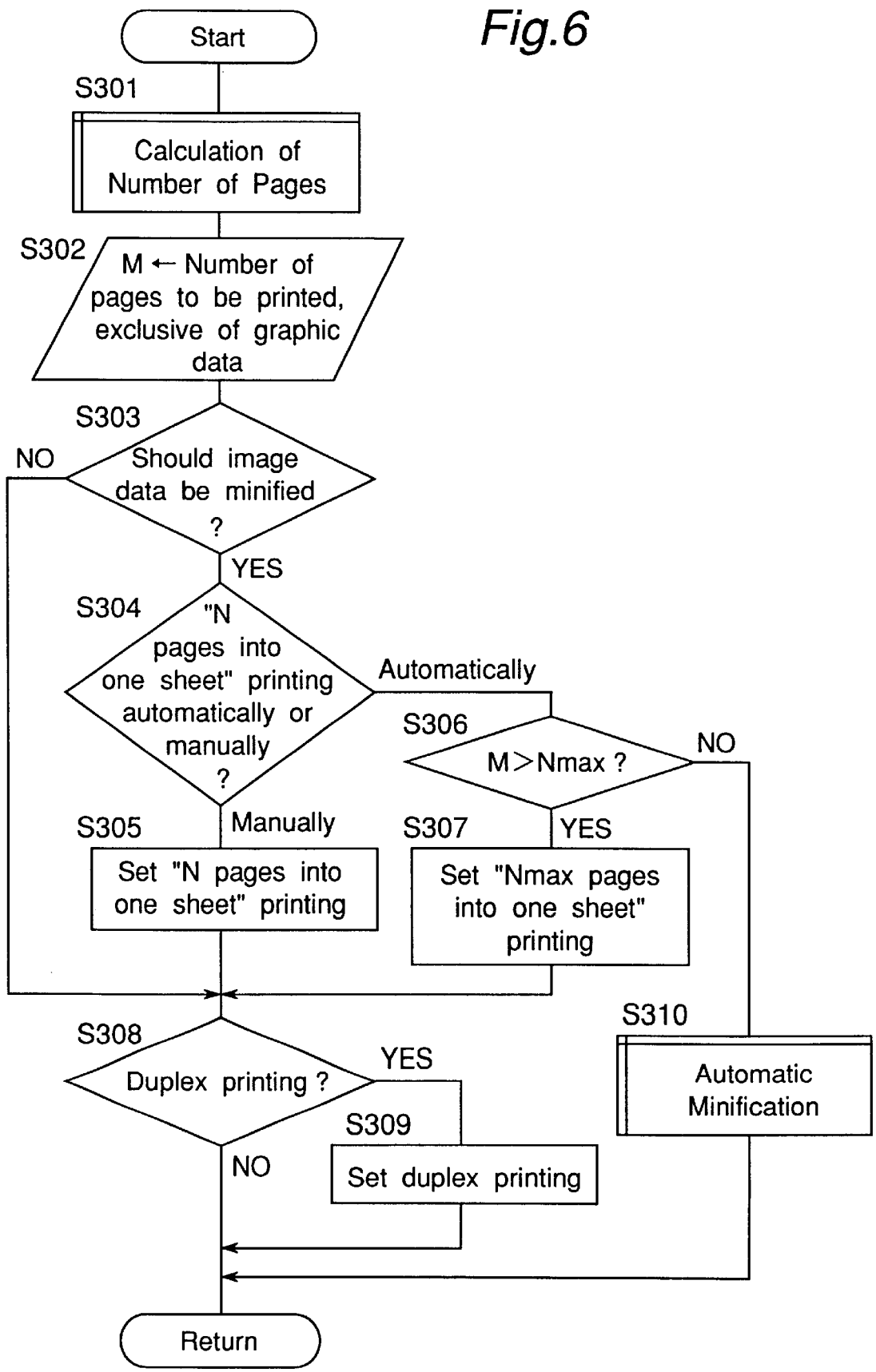
FIG. 6 is a flowchart of a process to be performed by an image data minifier in the embodiment.

FIG. 6 shows a flowchart showing the operation performed by the image data minifier 13. Contents of the processing performed by the image data minifier 13 will be described below with reference to FIG. 6. Herein, a mode of printing image data of a plurality of pages stored in the first data buffer 12a on one sheet of copying paper by minifying the image data is set.

At S301, the number of pages of image data to be printed, exclusive of graphic data, is calculated. It is possible to print all image data stored in the first data buffer 12a by minifying it such that the image data can be printed on one page. If, however, a large amount of image data is to be printed on one sheet of copying paper, a resulting printed image is too small to be practical. Thus, using a command or the image data minify mode key 7 of the control panel 3, the maximum number of pages of data which are to be collectively printed on one sheet of copying paper is set. The maximum number of pages is set as Nmax.

After the number of pages of data to be printed, exclusive of the graphic data, is calculated at S301, the calculated number of pages is stored as a variable M at S302. It is determined at S303 whether image data is to be minified. If it is determined that the image data is to be minified, then it is determined at S304 whether printing of N pages on one sheet of copying paper (hereinafter described as "N pages into one sheet" printing) should be set automatically or manually.

If it is determined that the setting should be done manually, the "N pages into one sheet" printing is set at S305 by using the number of pages N set beforehand by the user. On the other hand, if it is determined that the "N pages into one sheet" printing should be set automatically, the number M of printing pages is compared with Nmax. If M>Nmax, an "Nmax pages into one sheet" printing, i.e., printing of Nmax pages on one sheet of copying paper, is set at S307. On the other hand, if M≦Nmax, image data is automatically minified by the image data minifier 13, at S310, according to the number of printing pages M.

If it is determined at S304 that the "N pages into one sheet" printing should be set manually or if it is determined at S306 that M>Nmax, it is determined at S308 whether the image data is to be printed on both surfaces of a sheet of copying paper, that is, whether duplex printing mode has been set.

Figure 7:
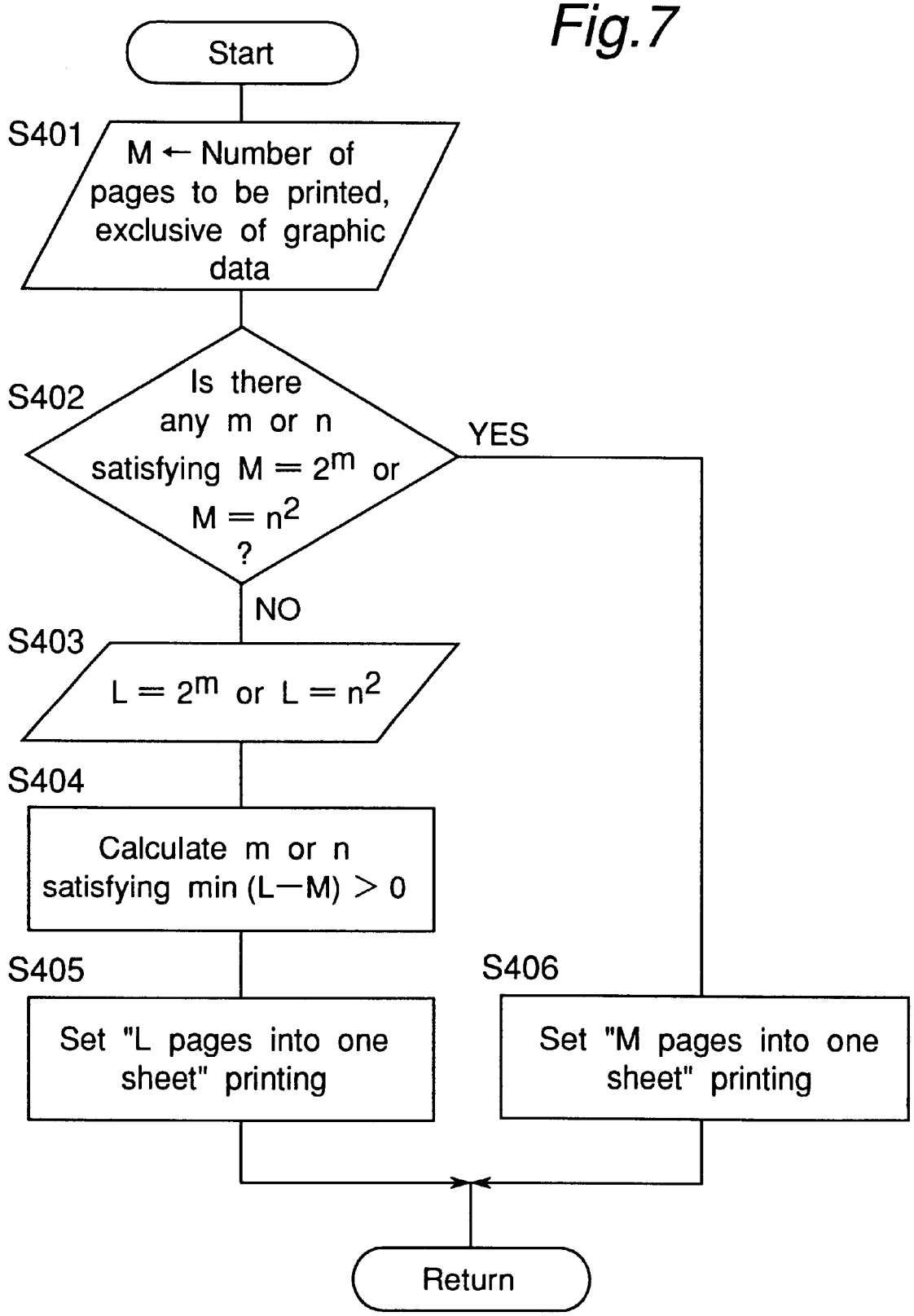
FIG. 7 is a flowchart of a process to be performed by an automatic image data minifier in the embodiment.

FIG. 7 is a flowchart showing the automatic image data minifying operation performed at step S310 of FIG. 6, which is described in detail below.

When the number M of printing pages is smaller than the preset maximum number of pages Nmax for the "N pages into one sheet" printing, an optimum minification of image data is executed according to the number M of printing pages. Herein, the number N in the "N pages into one sheet" printing is the mth power of two ($2^m$) or n squared ($n^2$) (where m and n are integers of one or larger).

Initially, at S401, the number of printing pages is stored as the variable M. Then, if it is determined at S402 that there is m or n satisfying $M=2^m$ or $M=n^2$, then an "M pages into one sheet" copying mode is set at S406.

If it is determined at S402 that there is not m or n satisfying $M=2^m$ or $M=n^{2'}$, then $2^m$ or $n^2$ is set as L at S403, and m or n which minimizes a value of L−M (>0) is calculated at S404, and an "L pages into one sheet" printing mode is set at S405.

Figure 8:
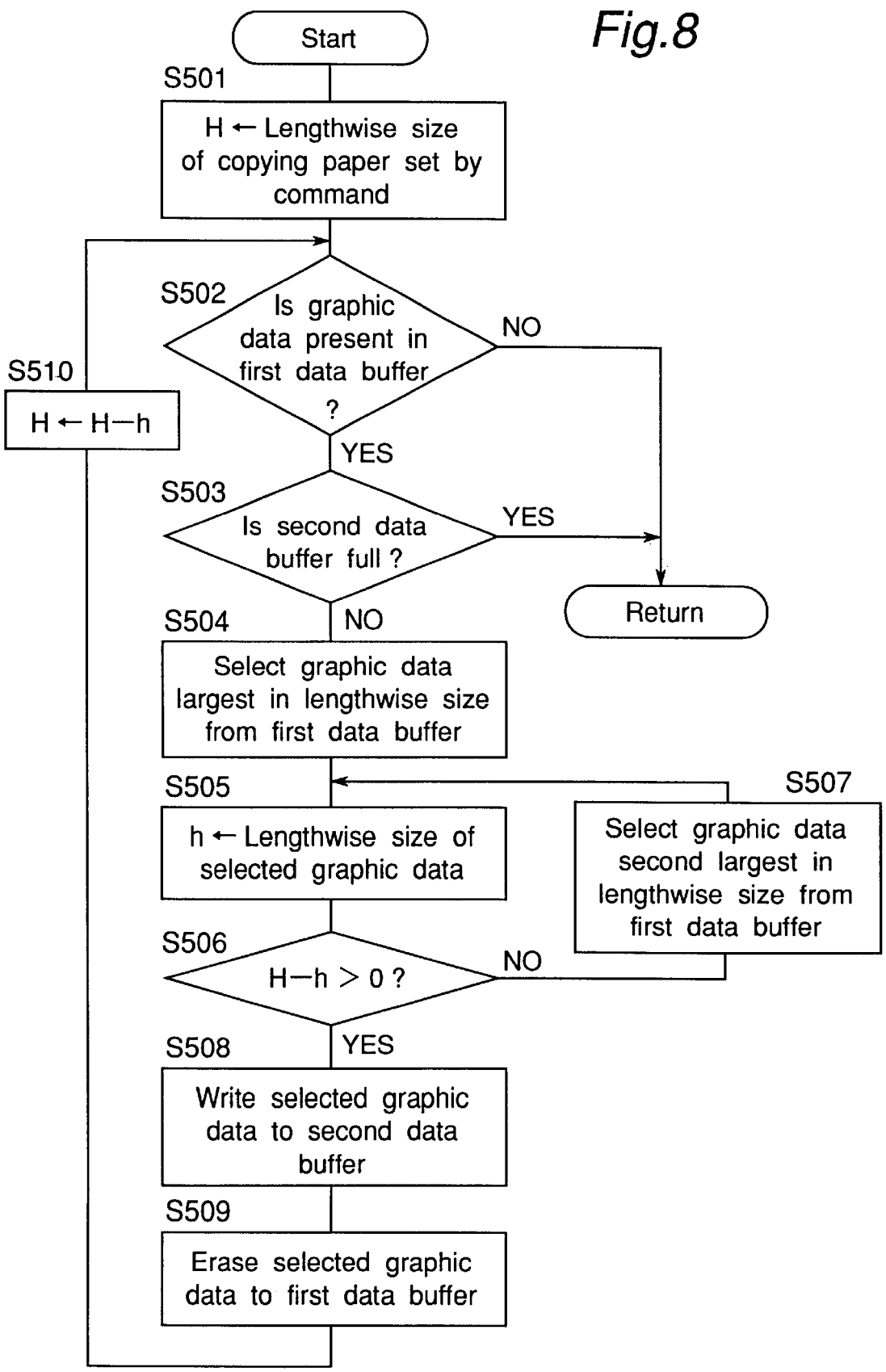
FIG. 8 is a flowchart of a graphic data optimum layout device in the embodiment.

FIG. 8 is a flowchart of the operation performed by the graphic data optimum layout device 14. The outline of the operation of the graphic data optimum layout device 14 is described below with reference to FIG. 8.

Initially, at S501, the size of copying paper set by a command is detected, and the lengthwise size of the copying paper is stored as variable H. Then, at S502, it is determined whether graphic data remains in the first data buffer 12b.

If it is determined that graphic data remains in the first data buffer 12b, it is determined at S503 whether the second data buffer 15 is write-enabled, or not full. If it is determined that the second data buffer 15 is write-enabled, or not full, then, graphic data largest in lengthwise size is selected from the graphic data stored in the first data buffer 12b at S504.

The lengthwise size of the graphic data selected at S504 is stored as variable h at S505. Then, at S506, h is compared with H. If h is determined to be larger than H (H−h<0), it is judged as over-page. Then, at S507, a graphic data second largest in the lengthwise size is selected from the first data buffer 12b. Then, the graphic data second largest in the lengthwise size is stored as variable h at S505.

The operation of S505 through S507 is repeated to write graphic data to the second data buffer 15 at S508, giving priority to graphic data larger in the lengthwise size.

At S509, the selected graphic data is erased from the first data buffer 12b. At S510, a value of H−h is stored as variable H.

The above operation is repeated until it is determined that the first data buffer 12b is empty at S502 or that the second data buffer 15 is full at S503.

Figure 9:
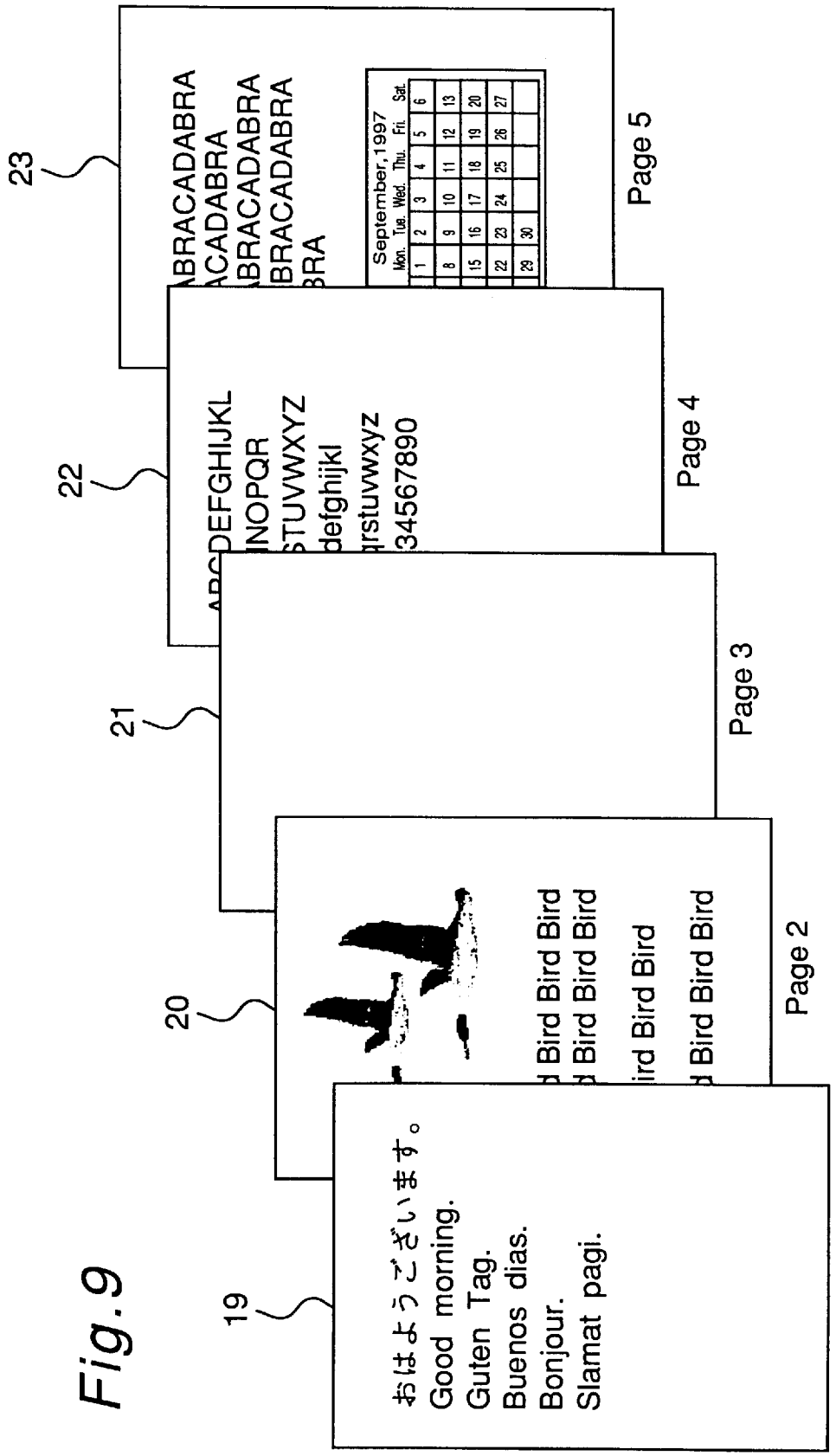
FIG. 9 shows an example of input data.
Figure 10:
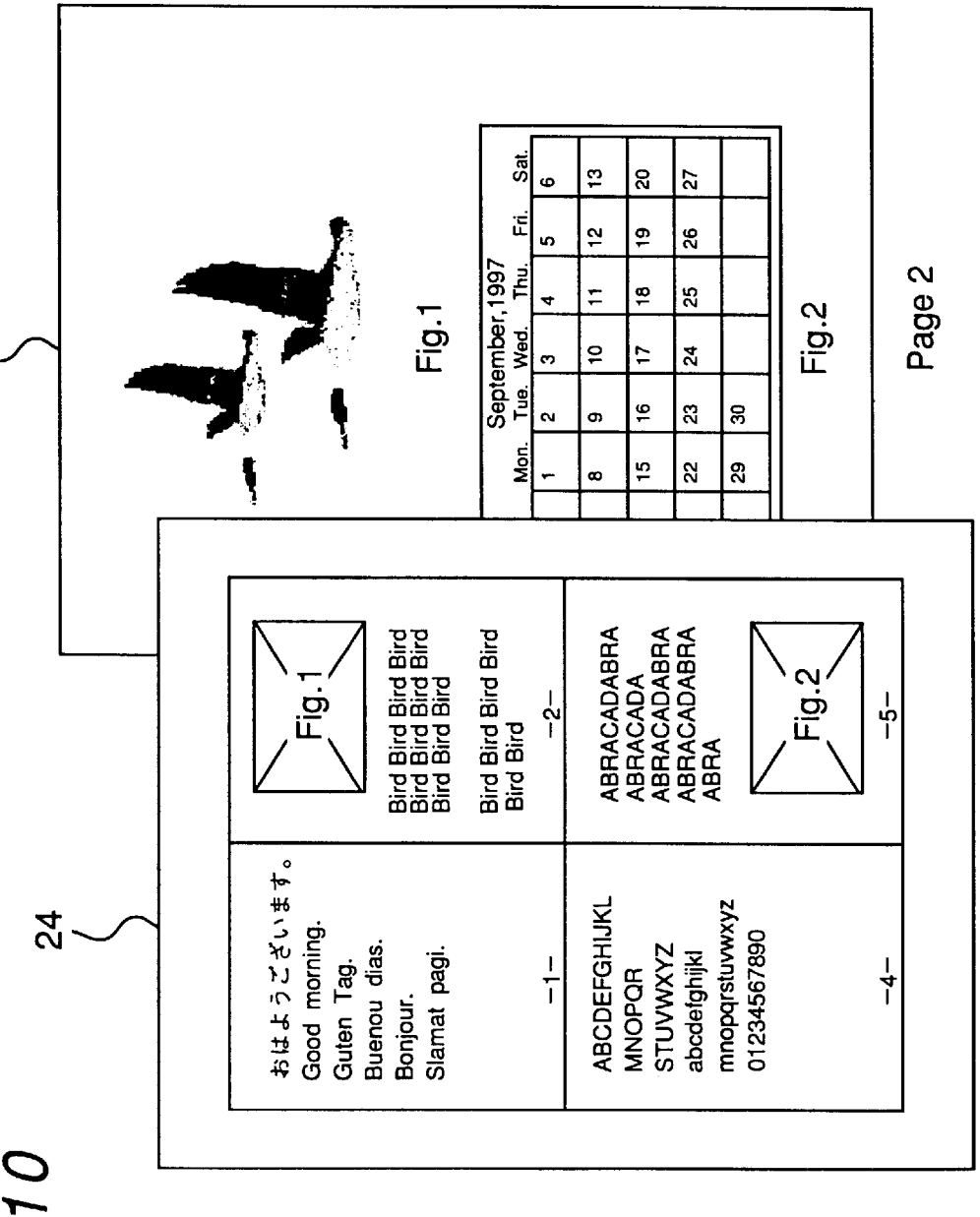
FIG. 10 shows an example of printout provided by trial printing for the input data shown in FIG. 9.

FIGS. 9 and 10 show an example of input data subjected to the trial printing of the present invention and the resulting printout, respectively. More specifically, the input data consists of the first and fourth input pages 19 and 22 including only text data (character data), the second and fifth input pages 20 and 23 including both text data and graphic data, and the third input page 21 consisting of a blank page. On the other hand, the printout consists of two output pages 24 and 25.

The first output page 24 bears minified images for four pages including no image for the input blank page, and the second output page 25 bears only graphic images which are not minified. For the minified images of four pages, page numbers corresponding to the pages of the input images are added. Graphic portions, represented by respective frames, in the minified images on the first page 24 and the graphic images on the second page 25 are given the same figure numbers, so that the user can know the positions in which the graphic images on the second page 25 are located. The figure numbers are automatically added in forming the images. In stead of figure numbers, any pieces of information to indicate the correspondence between the frame and the graphic image may be used.

In the above embodiment, the image forming apparatus 2 includes the first data buffer 12, the second data buffer 15, and the page buffer 17 which are constructed separately from one another. But the present invention is not limited to such arrangement. For example, the first data buffer 12, the second data buffer 15, and the page buffer 17 may be constructed as a single storage unit. In this case, it is necessary to perform address management of the storage unit. But use of a single storage unit allows the manufacturing cost to be less expensive than the construction in which different storage units are used. Further, use of a single storage unit allows the circuit dimensions to be smaller than the construction in which different storage units are used, thus saving space.

Furthermore, in the embodiment described above, the blank page detector 10, the graphic data detector 11, the first data buffer 12, the image data minifier 13, the graphic data optimum layout device 14, the second data buffer 15, the plotting section 16, and the page buffer 17 are constructed inside the image forming apparatus. But the present invention is not limited to this construction. For example, regarding the image forming apparatus as a system, a part of the construction may be appropriately provided inside an external information processing apparatus. In this case, the information processing apparatus can manage a plurality of printers centrally. Obviously, this not only reduces the manufacturing cost of each printer, but also enhances the effect of saving materials such as recording medium and developer, and reducing misprints when viewing the entire system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming apparatus comprising:

a first storage for storing image data;

an image data minifying device for converting the image data stored in the first storage into minified image data;

a second storage for storing the minified image data;

a plotting section for developing the image data stored in the first storage or the minified image data stored in the second storage into a plotting pattern;

a third storage for storing the plotting pattern;

an output section for processing the plotting pattern stored in the third storage into a visible image on a recording medium and outputting the recording medium;

a mode setting device for setting an operational mode of the image forming apparatus, the mode setting device switching the operational mode between a normal mode and a trial output mode, wherein in the normal mode, input image data for a plurality of pages are processed into images on the plurality of pages of the recording medium, while in the trial output mode, the input image data is processed into minified images on fewer pages of the recording medium for trial output such that a user can check an output result to be obtained in the normal mode beforehand; and a blank page detector for detecting a blank page with no image data from the input image data, wherein in the trial output mode, an image corresponding to the blank page detected by the blank page detector is not formed on the recording medium.

2. An image forming apparatus according to claim 1, further comprising a controller for adding data indicative of page numbers of the input image data to the minified image data at positions corresponding to respective page number areas such that the minified images derived from the minified image data are associated with the respective images derived from the input image data.

3. An image forming apparatus according to claim 1, further comprising a controller for, in the trial output mode, outputting image portions corresponding to character data included in the minified image data in the form of dots or frames.

4. An image forming apparatus according to claim 1, further comprising:

a graphic data detector for detecting graphic data included in the input image data; and a controller for, in the trial output mode, replacing the detected graphic data with data of a frame such that an image corresponding to the graphic data is represented by the frame.

5. An image forming apparatus according to claim 4, further comprising:

a graphic data storage for storing only the graphic data detected by the graphic data detector; and a controller for, in the trial output mode, reading the graphic data from the graphic data storage after formation of minified images based on the minified image data including no graphic data, so as to form a graphic image based on the graphic data, without minifying the graphic data, on a page of the recording medium different from the page or pages bearing the minified images.

6. An image forming apparatus according to claim 5, further comprising:

a graphic data optimum layout device for, in the trial output mode, performing an optimum layout of a plurality of the graphic data read from the graphic storage such that graphic images based on the plurality of the graphic data, not minified, are formed on as few pages as possible, independently of the minified images.

7. An image forming apparatus according to claim 5, further comprising:

a controller for adding mutually corresponding pieces of information to the graphic image and the frame in the minified image respectively when the graphic image is formed on the different page of the recording medium based on the graphic data not minified, to indicate correspondence between the graphic image and the frame indicative of the graphic image portion in the minified image.

* * * * *